United States Patent [19]

Imaizumi et al.

[11] Patent Number: 5,530,058
[45] Date of Patent: *Jun. 25, 1996

[54] POLYESTER RESIN COMPOSITION

[75] Inventors: Mitsuhiro Imaizumi; Masataka Kotani; Ryosuke Kamei, all of Kawasaki; Eiichiro Takiyama, Kamakura, all of Japan

[73] Assignee: Showa Highpolymer Co., Ltd., Tokyo, Japan

[ * ] Notice: The term of this patent shall not extend beyond the expiration date of Pat. No. 5,306,787.

[21] Appl. No.: 357,054

[22] Filed: Dec. 14, 1994

Related U.S. Application Data

[63] Continuation of Ser. No. 48,200, Apr. 20, 1993, abandoned.

[30] Foreign Application Priority Data

May 13, 1992 [JP] Japan ................................. 4-146462

[51] Int. Cl.⁶ .................................................. C08F 20/34
[52] U.S. Cl. ..................... 524/602; 524/539; 524/590; 525/440; 528/66; 528/81
[58] Field of Search ........................... 524/590, 539, 524/602; 525/440; 528/66, 81

[56] References Cited

U.S. PATENT DOCUMENTS

| | | | |
|---|---|---|---|
| 2,999,851 | 9/1961 | Elmer et al. | |
| 3,437,500 | 4/1969 | Hennig et al. | 528/81 |
| 4,166,873 | 9/1979 | Gilliam et al. | 428/35 |
| 4,438,235 | 3/1984 | Brzigys | 528/81 |
| 4,481,353 | 11/1984 | Nyilas et al. | 528/302 |
| 4,526,910 | 7/1985 | Das et al. | 524/493 |
| 4,719,247 | 1/1988 | Lin et al. | 528/60 |
| 4,843,112 | 6/1989 | Gerhart et al. | 523/114 |
| 5,324,794 | 6/1994 | Taka et al. | 525/440 |
| 5,391,644 | 2/1995 | Yasuda et al. | 525/440 |

FOREIGN PATENT DOCUMENTS

| | | | |
|---|---|---|---|
| 0323700 | 7/1989 | European Pat. Off. | |
| 0393819 | 10/1990 | European Pat. Off. | |
| 0448294 | 9/1991 | European Pat. Off. | |
| 1059075 | 3/1954 | France | |
| 3938322 | 5/1990 | Germany | 525/440 |
| 748872 | 5/1956 | United Kingdom | |

Primary Examiner—Paul R. Michl
Assistant Examiner—Andrew E. C. Merriam
Attorney, Agent, or Firm—Sughrue, Mion, Zinn, Macpeak & Seas

[57] ABSTRACT

An aliphatic polyester resin composition having a low combustion beat, characterized in that a filler is mixed with an aliphatic polyester having a number-average molecular weight of at least 10,000, synthesized from glycol and aliphatic polybasic acid or acid derivative thereof. A sheet formed from the composition bas excellent tensile strength, stiffness and impact strength as well as being biodegradable.

10 Claims, No Drawings

POLYESTER RESIN COMPOSITION

This is a continuation of application Ser. No. 08/048,200 filed Apr. 20, 1993, now abandoned.

BACKGROUND OF THE INVENTION

1. Field of the Invention

The present invention relates to an aliphatic polyester resin composition obtained by mixing a filler with aliphatic polyester in practice having substantially a high molecular weight, that is, having a number-average molecular weight of at least 10,000, which composition has a low combustion heat and biodegradability by microorganisms, and further has excellent heat stability and mechanical strength. The present invention also relates to a sheet obtained by processing such a composition and fabricated articles thereof.

2. Discussion of the Background

Conventionally, it is no exaggeration to say that high molecular weight polyesters (referring to polyesters having number-average molecular weights of at least 10,000) generally used for films, fibers and the like are limited to polyethylene terephthalate which is a condensate of terephthalic acid (including dimethyl terephthalate) and ethylene glycol or polybutylene terephthalate which is made from terephthalic acid and butyleneglycol.

In some examples 2,6-naphthalenedicarboxylic acid has been used instead of terephthalic acid, however, there has not been any example at all in which a polyester using an aliphatic dicarboxylic acid as the dicarboxylic acid has been molded into sheet, film or fiber form for practical use.

One of the reasons why the above mentioned polyester has not been practically used is that even if the aliphatic polyesters have crystallinity, most melting points of the above-mentioned aliphatic polyesters are 100° C. or lower and they also have poor heat stability when they are melted. Of further importance is that the properties, particularly mechanical properties such as tensile strength, of these aliphatic polyesters are of an extremely low level; the polyester having the same level of number-average molecular weight as that of the above-mentioned polyethylene terephthalate shows much poorer properties, thus practical uses have not been found at all for these aliphatic polyesters.

It seems that the studies to improve the physical properties of the aliphatic polyesters by increasing their number-average molecular weights have not made enough progress because of their poor heat stability.

Polyesters such as polyethylene terephthalate or the like, which are largely for general use in the fields of packaging containers and industrial materials at present are not biodegradable by microorganisms, and therefore remain forever without degrading if simply disposed of after use, thus causing the pollution of rivers, oceans and soil. In order to prevent such a problem, polyesters need to be incinerated. However, the amount of their combustion heat, that is 5,500–6,000 kcal/kg, is greater than the average value of the combustion heat of municipal refuse, though it is lower than polyethylene and polypropylene, and this causes a large amount of wear on incinerators.

An object of the present invention is to provide an aliphatic polyester resin composition which has sufficiently high molecular weight for practical use, and has excellent heat stability and mechanical properties typically represented by tensile strength, and which it easily disposed of because it has a low combustion heat and is able to be decomposed by microorganisms or the like. Further, the present invention is aimed at providing an aliphatic polyester resin composition that has intrinsic heat seal characteristics by nature, as well as providing a sheet obtained by such a composition and articles formed thereof.

SUMMARY OF THE INVENTION

The present invention has been achieved by developing an aliphatic polyester resin composition having a low combustion heat obtained by mixing a filler with aliphatic polyester having the number-average molecular weight of at least 10,000 synthesized from glycol and aliphatic dicarboxylic acid or an acid derivative thereof.

It has been found that aliphatic polyester resin composition having a low combustion heat have excellent mechanical properties when formed into a sheet and that such a sheet has characteristics extremely suited to heat forming such as vacuum forming and air-pressure forming so as to be formed into a molded article or part to thus complete the present invention.

DETAILED DESCRIPTION OF THE INVENTION

The present invention will be described below in further detail.

The aliphatic polyester of the present invention mainly consists of a polyester obtained by reacting two components of glycols and dicarboxylic acid (or acid anhydrides thereof), and if necessary as a third component, with at least one polyfunctional component selected from the group consisting of trifunctional or tetrafunctional polyols, oxycarboxylic acids, and polybasic carboxylic acids (or acid anhydrides thereof). The aliphatic polyesters are prepared by reacting relatively high molecular weight polyester prepolymers which have hydroxyl groups at ends with a coupling agent so as to make them even higher molecular weight polymer.

It has been known to obtain polyurethane by reacting a low molecular weight polyester prepolymer having a number-average molecular weight of 2,000–2,500, which have hydroxyl groups as the terminal groups, with diisocyanate as a coupling agent in the preparation of rubbers, foams, coatings and adhesives.

However, the polyester prepolymers used in these polyurethane foams, coatings and adhesives are prepolymers having a low molecular weight and a number-average molecular weight of 2,000–2,500 which is the maximum that can be prepared by non-catalytic reaction. To obtain practical physical properties as the polyurethane, it is necessary that the content of diisocyanate should be as much as 10–20 parts by weight in relation to 100 parts by weight of this low molecular weight prepolymer. When such a large amount of diisocyanate is added to the low molecular weight polyester, gelation occurs so that no normal resins which can be molded in the form of a melt can be obtained.

Also, as shown in the case of polyurethane rubbers, although a method is conceivable in which hydroxyl groups are converted into isocyanate groups by the addition of diisocyanate, and then the number-average molecular weight thereof is further increased by using glycols, the same problem as mentioned above arises because 10 parts by weight of diisocyanate relative to 100 parts by weight of the prepolymer should be used in order to obtain practical physical properties.

When a relatively high molecular weight polyester prepolymer is to be used, heavy metal catalysts required to prepare the prepolymer would promote the reactivity of the above-mentioned isocyanate groups to undesirably cause poor preservativity, generation of crosslinking and branching; hence a number-average molecular weight of not more than around 2,500 of polyester prepolymers would be the limit if they were to be prepared without catalysts.

The polyester prepolymers to obtain the aliphatic polyesters used in the present invention are relatively high molecular weight saturated aliphatic polyesters having substantially hydroxyl groups at the ends thereof, number-average molecular weights of at least 5,000, preferably at least 10,000, and melting point of 60° C. or higher, which are obtained by reacting glycols and dibasic acids (or acid derivatives thereof) in the presence of catalysts.

When a prepolymer having a number-average molecular weight of lower than 5,000 is used, the small amounts of 0.1–5 parts by weight of coupling agents used in the present invention cannot provide polyesters for blow-molding having good physical properties. When polyester prepolymers having number-average molecular weights of 5,000 or higher are used, with hydroxyl values of 30 or less, the use of small amounts of coupling agents even under severe conditions such as a molten state and the like can produce high molecular weight polyesters without gelation as the reaction is not affected by remained catalyst.

Therefore, the polymer for the polyester resin composition of the present invention has a repeated chain structure in which a polyester prepolymer having a number-average molecular weight of 5,000 or more, preferably 10,000 or more and consisting of an aliphatic glycol and aliphatic dicarboxylic acid is combined through the urethane bonds derived from, for example, di-isocyanate as a coupling agent.

Further, the polymer for the polyester resin composition of the present invention has a repeated chain structure in which the above-mentioned polyester prepolymer provided with branched long chains derived from polyfunctional components is combined through the urethane bonds derived from, for example, di-isocyanate as a coupling agent. When oxazoline, epoxy compounds, and acid anhydrides are used as a coupling agent, the polyester prepolymer has a repeated chain structure through ester bonds.

As aforementioned, the polyester resin composition consists of an aliphatic polyester obtained by reacting 0.1–5 parts by weight of diisocyanate, for example, as a coupling agent with 100 parts by weight of an aliphatic polyester prepolymer having a number-average molecular weight of 5,000 or more and a melting point of at least 60° C. and fillers; the composition having a melting point of at least 60° C. and fillers; the composition having a melt viscosity of $1.0 \times 10^3$ –$1.0 \times 10^6$ poises at a temperature of 190° C. and shear rate of 100 sec$^{-1}$.

A sheet formed from a composition of the aliphatic polyester resin according to the present invention has biodegradability when it is buried in the ground, and it has a lower combustion heat when it is incinerated, approximately one third of that of polyolefin resins such as polypropylene, polyethylene, or the like, being equivalent to paper and it is also excellent in tensile strength, stiffness and impact strength. Thus, the sheet of the present invention is useful as food container sheets, packaging sheets and general use sheets, and is useful as materials for fabricated articles.

Examples of glycols which can be used as a reaction component include aliphatic glycols. Among them those having a straight chain alkylene group with even number carbon atoms of 2, 4, 6, 8 and 10 such as: ethylene glycol, 1,4-butanediol, 1,6-hexanediol, 1,8-octanediol, 1,10-decanediol, and mixtures thereof are preferable.

Of these glycols, those having a smaller number of carbon atoms, such as ethylene glycol, 1,4-butanediol and 1,6-hexanediol, are preferable because they can produce an aliphatic polyester having a high crystallinity and a high melting point. In particular, ethylene glycol and 1,4-butanediol are most suitable because they produce good results.

Examples of aliphatic dicarboxylic acids or anhydrides thereof which provide aliphatic polyester by reacting with glycols include aliphatic dicarboxylic acids. Among them those having a straight chain alkylene group with even number carbon atoms of 2, 4, 6, 8 and 10 such as: succinic acid, adipic acid, suberic acid, sebacic acid, 1,10-decanedicarboxylic acid, succinic anhydride and lower alcohol ester thereof such as dimethylester, and the like and mixtures thereof are preferable. Of these dicarboxylic acids, those having a smaller number of carbon atoms, such as succinic acid, adipic acid and succinic anhydride, are preferable because they can produce an aliphatic polyester having high crystallinity and high melting points. In particular, succinic acid, succinic anhydride and an acid mixture of succinic acid or succinic anhydride and another dicarboxylic acid such as adipic acid, suberic acid, sebacic acid or 1,10-decandicarboxylic acid are preferable.

In the system of an acid mixture containing two or more acid components, for example, succinic acid and other dicarboxylic acids, the mixing ratio of succinic acid is at least 70 mol %, preferably at least 90 mol %, and the mixing ratio of the other carboxylic acids is 30 mol % or less, preferably 10 mol % or less.

A combination of 1,4-butanediol and succinic acid or succinic anhydride and a combination of ethylene glycol and succinic acid or succinic anhydride are particularly preferable for the present invention because the combinations exhibit melting points close to that of polyethylene.

These compounds are initially prepared as low molecular esters and later may be transformed into high molecular esters by a deglycol reaction.

(Third component)

To these glycols and dicarboxylic acid, if necessary, may be added as a third component at least one polyfunctional component selected from the group consisting of trifunctional or tetrafunctional polyols, oxycarboxylic acid, and polybasic carboxylic acids (or acid anhydrides thereof). The addition of this third component, which causes the branching of long chains, can impart desirable properties in molten state to the polyester prepolymer, because the ratio of weight-average molecular weight (MW)/number-average molecular weight (Mn), i.e., the molecular weight distribution, increases with increases in its molecular weight.

In the specification of the present invention, "polyols" includes glycols, tri- or tetrafunctional polyols; and "polybasic acids" includes dicarboxlic acids, poybasic carboxylic acids having 3 or more of carboxyl groups in a molecule and oxycarboxylic acids.

In terms of the amount of polyfunctional components to be added without fear of gelation, a trifunctional component of 0.1–5 mole %, or a tetrafunctional component of 0.1–3 mole % is added relative to 100 mole % of the total of aliphatic dicarboxylic acid (or acid anhydride thereof) components.

(Polyfunctional components)

Examples of polyfunctional components as the third component include trifunctional or tetrafunctional polyols, oxycarboxylic acids, and polybasic-carboxylic acids.

The trifunctional polyols alcohols representatively include trimethylol propane, glycerin or anhydrides thereof. The tetrafunctional polyols representatively include pentaerythritol.

The trifunctional oxycarboxylic acid components are divided into the two types of (i) a component which has two carboxyl groups and one hydroxyl group in one molecule, and (ii) another component which has one carboxyl group and two hydroxyl groups in one molecule. Malic acid which has two carboxyl groups and one hydroxyl group in one molecule becomes practical and sufficient to the purposes of the present invention in view of commercial availability at low cost.

The tetrafunctional oxycarboxylic acid components are the following three types of components:

(i) A component which has three carboxyl groups and one hydroxyl group in one molecule;

(ii) Another component which has two carboxyl groups and two hydroxyl group in one molecule; and (iii) The remaining component which has three hydroxyl groups and one carboxyl group in one molecule. Any type can be used, though in view of commercial availability at low cost, citric acid and tartaric acid are practical and sufficient to the purposes of the present invention.

As a trifunctional polybasic carboxylic acid (or acid anhydride thereof) component trimesic acid, propane tricarboxylic acid and the like can be used. Among them, trimesic anhydride is practical for the purposes of the present invention.

As a tetrafunctional polybasic-carboxylic acid (or anhydride thereof) various types of aliphatic compounds, cycloaliphatic compounds, aromatic compounds and the like, described in certain literatures, can be used. In view of commercial availability, for example, pyromellitic anhydride, benzophenone tetracarboxylic anhydride and cyclopentane tetracarboxylic anhydride are practical and sufficient to the purposes of the present invention.

These glycols and dibasic acids are mainly consisted of aliphatic series, while small amounts of other components, for example, aromatic series may be concomitantly used. These other components may be blended or copolymerized in amounts up to 20% by weight, preferably up to 10% by weight, and more preferably up to 5% by weight because using these compounds degrades biodegradability.

The polyester prepolymer for aliphatic polyesters to be used in the present invention has hydroxyl groups at the terminals. To introduce the hydroxyl groups, it is necessary that glycols are used somewhat excessively.

For preparation of the polyester prepolymer having a relatively high molecular weight, it is necessary to use deglycol-reaction catalysts in the deglycol reaction subsequent to the esterification.

Examples of the deglycol-reaction catalysts include titanium compounds such as acetoacetoyl type titanium chelate compounds and organic alkoxy titanium compounds and the like. These titanium compounds can be used in combination. Examples of compounds used in combination include diacetoacetoxy oxytitanium (Nippon Chemical Industry Co., Ltd.; Nursem Titanium) tetraethoxy titanium, tetrapropoxy titanium, tetrabutoxy titanium and the like. The amount of the titanium compound used is 0.001–1 part by weight, and preferably 0.01–0.1 part by weight relative to 100 parts by weight of the polyester prepolymer. These titanium compounds may be blended before the esterification, or may be blended immediately before the deglycol-reaction.

As a result, polyester prepolymers having a number-average molecular weight of at least 5,000, and preferably at least 20,000 and a melting point of 60° C. or higher, can be generally obtained easily. It is even more preferable if these polyester prepolymers have crystallization.

To the polyester prepolymer which has a number-average molecular weight of at least 5,000, preferably at least 10,000, and whose terminal groups are substantially hydroxyl groups are added coupling agents in order to increase its number-average molecular weight.

Examples of the coupling agents include diisocyanate, oxazoline, diepoxy compounds, acid anhydrides and the like. Diisocyanate is particularly preferred.

In the cases of oxazoline and diepoxy compounds, it is necessary that the terminal hydroxyl groups are reacted with acid anhydrides and the like to convert them into carboxyl groups, then coupling agents are used.

Although not limited, examples of diisocyanate include 2,4-tolylene diisocyanate, a mixture of 2,4-tolylene diisocyanate and 2,6-tolylene diisocyanate, diphenylmethane diisocyanate, 1,5-naphthylene diisocyanate, xylylene diisocyanate, hydrogenated xylylene diisocyanate, hexamethylene diisocyanate, isophorone diisocyanate and the like. Particularly, hexamethylene diisocyanate is preferably used in terms of hue of prepared resins, reactivity at the time of blending polyesters, and the like.

The adding amounts of these coupling agents are 0.1–5 parts by weight, and preferably 0.5–3 parts by weight relative to 100 parts by weight of polyester prepolymer.

Addition of less than 0.1 part by weight causes insufficient coupling reaction, whereas with more than 5 parts by weight gelation tends to occur.

The addition is preferably performed when the polyester is in a uniformly melted state under easily stirrable conditions. Although it is not impossible for the coupling agents to be added to the polyester prepolymer in solid state and melted and mixed through an extruder, adding the agents into a polyester preparation unit, or into polyester prepolymer in a molten state (for example, in a kneader), is more practical.

In this case, the number-average molecular weight of the aliphatic polyester is at least 10,000, thereby forming a polyester resin or a polyester resin composition which has sufficient mechanical properties. One desirable composition is made of an aliphatic polyester which contains 0.03–3.0% by weight of urethane bond, preferably 0.05–2.0% by weight of urethane bonds, more preferably 0.1–1.0% by weight of urethane bonds.

Fillers used in the present invention are widely used in the fields of synthetic resins and rubber in general. Such fillers are inorganic compounds or metal that do not react with oxygen or water, and fillers which do not decompose during kneading and forming are preferably used. Fillers include metallic oxides such as aluminium, copper, iron, lead, nickel, magnesium, calcium, barium, zinc, zirconium, molybdenum, silicon, antimony, titanium, or the like, hydrates (hydroxide) thereof, compounds such as sulfate, carbonate, silicate or the like, double salts of these components, compounds of these components, and carbon fibers. A typical example of the fillers are exemplified, as disclosed in Japanese Patent Laid Open No. 4-31934, by the above metals, aluminium oxide (alumina) and hydrate thereof, calcium hydroxide, magnesium oxide (magnesia), magnesium hydroxide, zinc oxide (chinese white), lead oxide such as red lead oxide, basic lead carbonate, magnesium carbonate, calcium carbonate, basic magnesium carbonate, white carbon, asbestos, mica, talc, glass fiber, glass bead, clay, diatomaceous earth, silica, wollastonite, iron oxide, antimony oxide, titanium oxide (titania), lothopone, ground pumice, aluminium sulfate (gypsum and the like), zirconium silicate, zirconium oxide, barium carbonate, dolomite, molybdenum disulfide and iron sand, and the like.

Among these fillers, powdered fillers preferably have a diameter of 30 μm or less (and more preferably, 10 μm or less), and fibrous fillers preferably have a diameter of between 1–100 μm (and more preferably, 1–80 μm) and a length of 0.1–10 mm (and more preferably, 0.1–5.0 mm). Further, flaky (flake-shaped) fillers preferably are 30 μm or less (and more preferably, 10 μm or less). Among these, the fillers and the powdered fillers are preferable.

The composition ratio (the additive ratio) of an inorganic filler to the polyester resin composition is between 10–70% by weight, and preferably, 15–65% by weight, and more preferably 20–60% by weight. More than 70% by weight of the composition ratio (the additive ratio) of the inorganic filler in the polyester resin composition including the inorganic filler reduces impact strength of the resulting sheet or container, making the composition unsuitable for producing a practical sheet or a container. On the other hand, less than 10% by weight fails to achieve either 5,000 kcal/kg or less combustion heat or improve rigidity and heat resistance.

The resulting aliphatic polyester resin composition has a melt viscosity of $1.0 \times 10^3$–$1.0 \times 10^6$ poise at a temperature of 190° C. at a shear rate of 100 (sec$^{-1}$), and more preferably, $1.0 \times 10^4$–$5.0 \times 10^5$ poise. A melt viscosity of less than 1,000 poise makes processing easy but reduces mechanical properties such as heat resistance (in particular, heat stability of the sheet), impact strength, elongation at break extension and the like. Conversely, a melt viscosity of more than $10^6$ poise reduces extrudability due to heat-emission, etc. and thus good quality sheet cannot be obtained.

The melt viscosity at a shear rate of 100 sec$^{-1}$ was calculated from a graph which shows the relationship between the apparent viscosities and the shear rates measured by a capillary rheometer using a nozzle having a diameter of 1.0 mm and L/D of 10 at a resin temperature of 190° C.

A production of the polyester resin composition according to the present invention is achieved by mixing a filler homogeneously with polyester resin at a desired ratio. Mixing methods include a method of kneading a filler and polyester resin in a molten state by using mixers such as an extrusion machine, a mixing roll, a kneader, a roll mill, a Banbury mixer, a continuous mixer, or the like. Or a highly-concentrated filler masterbatch in a polyester resin, for example, or the like may be produced; and the resulting masterbatch (a mixture) and polyester resin may be mixed.

The resulting polyester resin composition may be used as it is. However, in accordance with the desired use, additives such as stabilizers against oxygen, light (ultraviolet) and heat, flame retardants, lubricants, workability modifiers, colorings, antistatic agents, electrical characteristics modifiers, adhesion modifiers, or the like, may be added as for they do not impairing the foregoing characteristics (advantages) of the polyester resin composition according to the present invention.

The aliphatic polyester resin composition is formed into a sheet by employing various methods such as a calendar method, a T-die method, or the like. In this case, resin temperature is between 100–270° C., and more preferably, between 100–250°0 C. It is inconvenient to go out of these ranges because a temperature of lower than 100° C. increases viscosity and thus makes sheet-forming difficult, whereas a temperature of higher than 270° C. degrades the resin quality.

The aliphatic polyester composition having a combustion heat of 5,000 kcal/kg or less can improve the heat resistance and stiffness, and is applicable to packaging materials and plastic sheets for general use. Further, since the resulting sheet is suitable for vacuum forming and air-pressure forming, it is suitable for materials for formed articles or parts such as containers or the like produced by employing such a secondary thermal-forming.

EXAMPLES

Methods of the present invention are illustrated with reference to the following examples, but the invention is not intended to be limited thereto.

In the following Examples the biodegradability was evaluated according to the following process. A sheet of 10 cm×20 cm was inserted between stainless frames providing with polyethylene, buried in the ground at a depth of 10 cm and dug out after 12 months. This was compared with a commercially available paper board having the same thickness. The evaluation thereof is preferably the condition A below.

Condition A: The aliphatic polyester sheet decomposes to a greater degree than the paper board and the sheet is ragged with openings.

Condition B: The paper board decomposes to a greater degree than the aliphatic polyester sheet, which retains its shape as an aliphatic polyester sheet.

The tensile characteristics were measured according to JIS K7113 and the amount of combustion heat was measured according to calorimetry according to JIS M8814. The stiffness was measured by Olsen stiffness meter (ASTM D747) in terms of both directions of MD and TD and the lower value was determined as the measured value. The dart impact strength was measured according to ASTM D1709.

(Example 1)

A 700 L reactor was purged with nitrogen, then 183 kg of 1,4-butanediol and 224 kg of succinic acid were charged in it. After the temperature was elevated under nitrogen stream, esterification by dehydration condensation was carried out for 3.5 hr at 192°–220° C., and after ceasing nitrogen charge, for further 3.5 hr under reduced pressures of 20-2 mmHg. A sample collected had an acid value of 9.2 mg/g, a number-average molecular weight (Mn) of 5,160 and a weight-average molecular weight (Mw) of 10,670. Subsequently, 34 g of tetraisopropoxy titanium, a catalyst, was added at normal pressures under nitrogen stream. The temperature was elevated to carry out a deglycol-reaction at temperatures of 215°–220° C. under reduced pressures of 15-0.2 mmHg for 5.5 hr. A sample collected had a number-average molecular weight (Mn) of 16,800 and a weight-average molecular weight (Mw) of 43,600. The yield of resulting polyester prepolymer (A1) was 339 kg except condensate water.

5.42 kg of hexamethylene diisocyanate was added to the reactor containing 339 kg of the polyester prepolymer (A1) to perform a coupling reaction for 1 hr at 180°–200° C. The viscosity was rapidly increased, but no gelation occurred. Then, 1.70 kg of Irganox 1010 (Ciba-geigy) as an antioxidant and 1.70 kg of calcium stearate as a lubricant were added, and the mixture was further stirred for 30 min. The resulting reaction product was extruded into water, and cut by a cutter into pellets. The aliphatic polyester (81) obtained after drying in a vacuum at 90° C. for 6 hr had a yield of 300 kg.

The obtained polyester (B1) was a slightly ivorylike white, waxy crystal, and had a melting point of 110° C., a number-average molecular weight (Mn) of 35,500 a weight-average molecular weight (Mw) of 170,000, a MFR (190° C.) of 1.0 g/10 min, a viscosity of 230 poises in a 10% orthochlorophenol solution and a melt viscosity of $1.5 \times 10^4$ poises at a temperature of 190° C. at a shear rate of 100 $sec^{-1}$. The average molecular weight was measured by a Shodex GPC System-11 (Showa Denko, gel permiation chromatography) using a HFIPA solution containing 5 mmol $CF_3COONa$ (concentration of 0.1% by weight) as a medium. A calibration curve was drawn using a PMMA standard sample (Shodex Standard M-75, Showa Denko).

After mixing and blending 70 wt % polyester resin and 30 wt % talc having an average diameter of 5.0 µm in a Henschel mixer, it was kneaded and pelletized at a resin temperature of 180° C. by using a biaxial extruder in which screws rotate in the same direction having a screw diameter of 50 m/m. The melt viscosity of the resulting composition was $2.3 \times 10^4$ poise at a temperature of 190° C. and a shear rate of 100 $sec^{-1}$.

A method and conditions for producing a sheet using polyester (B1) composition

Polyester (B1) composition prepared above was extruded from a T-die having a width of 350 mm (a lip gap of 1.0 mm) at a resin temperature of 180° C. by employing an L/D=32 extruder having a screw diameter of 40 mmø. A sheet was formed with first and second cooling rolls having a temperature of 60° C. so that a sheet having a thickness of approximately 750 µm was produced.

Furthermore, the resulting sheet was formed in a vacuum foaming machine (Asano Corporation, model FLX-02, infrared-heating on both surfaces in an oven) so that a container (length: 140 mm; width: 140 mm; depth: 45mm) was produced. There was no problem in sheet-forming and vacuum-forming, and the resulting container had no distortion.

The tests on tensile strength at break (JIS K-7113) of MD and TD of the resulting sheet and container, stiffness by Olsen stiffness meter (ASTM D-747), notched Izod impact strength with a notch (JIS K-7110) at a temperature of 23° C., the amount of combustion heat, sheet-forming characteristics, and biodegradability were performed, and the evaluation results are shown in Table 1.

(Example 2)

Example 2 was performed in the same way as in Example 1, except that the filler amount was 40 wt % of talc. The melt viscosity was $2.7 \times 10^4$ poises. No problem forming was observed. The evaluation results of the resulting sheet and container are shown in Table 1.

(Example 3)

Example 3 was performed in the same way as in Example 1, except that the filler was a calcium carbonate having an average diameter of 1 µm. The melt viscosity was $2.0 \times 10^4$ poise. No problem for in forming was observed. The evaluation results of the resulting sheet and container are shown in Table 1.

(Example 4)

A 700 L reactor was purged with nitrogen, then 177 kg of 1,4-butanediol, 198 kg of succinic acid and 25 kg of adipic acid were charged in it. After the temperature was elevated under nitrogen stream, esterification by dehydration condensation was performed for 3.5 hr at 190°–210° C., and after ceasing nitrogen charge, for further 3.5 hr under reduced pressures of 20-2 mmHg. A sample collected had an acid value of 9.6 mg/g, a number-average molecular weight (Mn) of 6,100 and weight-average molecular weight (Mw) of 12,200. Subsequently, 20 g of tetraisopropoxy titanium, a catalyst, was added at normal pressures under nitrogen stream. The temperature was elevated to perform a deglycol-reaction at temperatures of 210°–220° C. under reduced pressures of 15-0.2 mmHg for 6.5 hr. A sample collected had a number-average molecular weight (Mn) of 17,300 and a weight-average molecular weight (Mw) of 46,400. The resulting polyester (A2) had a yield of 337 kg except condensate water.

4.66 kg of hexamethylene diisocyanate was added to the reactor containing 333 kg of polyester (A2) to perform a coupling reaction for 1 hr at 180°–200° C. The viscosity was rapidly increased, but no gelation occurred. Then, 1.70 kg of Irganox 1010 (Ciba-Geigy) as an antioxidant and 1.70 kg of calcium stearate as a lubricant were added, and the mixture was further stirred for 30 min. The resulting reaction product was extruded into water by an extruder, and cut by a cutter into pellets. The aliphatic polyester (B2) obtained after drying in a vacuum at 90° C. for 6 hr had a yield of 300 kg.

The obtained polyester (B2) was a slightly ivorylike white, waxy crystal, and had a melting point of 103° C., a number-average molecular weight (Mn) of 36,000, a weight-average molecular weight (Mw) of 200,900, a MFR (190° C.) of 0.52 g/10 min, a viscosity of 680 poises in a 10% orthochlorophenol solution and a melt viscosity of $2.2 \times 10^4$ poises at a temperature of 190° C. at a shear rate of 100 $sec^{-1}$.

A sheet was produced under the same conditions as in Example 1, except that a mixture of 70 wt % of the polyester resin (B2) and 30 wt % talc having an average diameter of 5 µm were pelletized at a resin temperature of 200° C. and that a sheet was formed at a resin temperature of 190° C. The melt viscosity was $2.9 \times 10^4$ poise.

Further, the sheet was formed into a container having the same size using the vacuum forming machine made by Asano Corporation in Example 1. There was no problem in forming, and the resulting container had no distortion.

(Example 5)

A 700 L reactor was purged with nitrogen, then 200 kg of 1,4-butanediol, 250 kg of succinic acid and 2.8 kg of trimethylol propane were charged in it. After the temperature was elevated under nitrogen stream, esterification by dehydration condensation was performed for 4.5 hr at 192°–220° C., and after ceasing nitrogen charge, for further 5.5 hr under reduced pressures of 20-2 mmHg. A sample collected had an acid value of 10.4 mg/g, a number-average molecular weight (Mn) of 4,900 and a weight average molecular weight (Mw) of 10,000. Subsequently, 37 g of tetraisopropoxy titanium, a catalyst, was added at normal pressures under nitrogen stream. The temperature was elevated to perform a deglycol-reaction at temperatures of 210°–220° C. under reduced pressures of 15-1.0 mmHg for 8 hr. A sample collected had a number-average molecular weight (Mn) of 16,900 and a weight-average molecular weight (Mw) of 90,300. The resulting polyester (A4) had a yield of 367 kg except condensate water of 76 kg.

3.67 kg of hexamethylene diisocyanate was added to the reactor containing 367 kg of polyester (A4) to perform a coupling reaction for 1 hr at 160°–200° C. The viscosity was rapidly increased, but no gelation occurred. Then, 367 g of Irganox 1010 (Ciba-Geigy) as an antioxidant and 367 g of calcium stearate as a lubricant were added, and the mixture was further stirred for 30 min. The resulting reaction product was extruded into water by an extruder, and cut by a cutter into pellets. The polyester (B4) obtained after drying in a vacuum at 90° C. for 6 hr had a yield of 350 kg.

The obtained polyester (B4) was a slightly ivorylike white, waxy crystal, and had a melting point of 110° C., a number-average molecular weight (Mn) of 17,900 a weight-average molecular weight (Mw) of 161,500 (Mw/Mn=9.0), a MFR (190° C.) of 0.21 g/10 min and a melt viscosity of $2.0 \times 10^4$ poises at a temperature of 180° C. at a shear rate of 100 $\sec^{-1}$. The average molecular weight was measured in the same manner as in Example 1.

The polyester (B3) was formed in the same manner as in Example 1. The melt viscosity was $2.7 \times 10^4$ poises and no problem in forming was observed. The evaluation results for the thus obtained sheet and container are shown in Table 1.

(Comparative Example 1)

Polyester A1 was used in the same manner as in Example 1. The pelletizing characteristics in this example were worse than that of Example 1 and the strength was extremely weak. Thus, sheet-forming could not be performed.

The evaluation results of the obtained sheets and containers are shown in Table 1.

TABLE 1

|  | Tensile Strength at Break (kg/cm$^2$) | | Stiffness (kg/cm$^2$) | Notched Izod impact (kg/cm$^2$) |
| --- | --- | --- | --- | --- |
|  | MD | TD |  |  |
| Example |  |  |  |  |
| 1 | 580 | 500 | 7600 | 1.2 |
| 2 | 600 | 520 | 8200 | 1.0 |
| 3 | 560 | 480 | 7000 | 1.3 |
| 4 | 500 | 405 | 7500 | 2.0 |
| 5 | 600 | 550 | 8000 | 1.5 |
| Comparative Example |  |  |  |  |
| 1 | No sheet was formed. | | — | — |

|  | Dart Impact (kg · cm, 23° C.) | Combustion Heat (kcal/kg) | Container Forming Performance | Biodegradability |
| --- | --- | --- | --- | --- |
| Example |  |  |  |  |
| 1 | 160 | 4200 | good | A |
| 2 | 130 | 3600 | good | A |
| 3 | 160 | 4150 | good | A |
| 4 | 175 | 4140 | good | A |
| 5 | 150 | 4100 | good | A |
| Comparative Example |  |  |  |  |
| 1 | — | 4140 | — | — |

What is claimed is:

1. A crystalline aliphatic polyester resin composition having a low combustion heat, wherein a filler is mixed with a crystalline aliphatic polyester having a melt viscosity of $1.0 \times 10^3 - 1.0 \times 10^6$ poises at a temperature of 190° C. and a shear rate of 100 $\sec^{-1}$, wherein said crystalline aliphatic polyester is obtained by adding from 0.1 to 5 parts by weight of diisocyanate to 100 parts by weight of a prepolymer in a molten state, wherein said prepolymer (A) is obtained from a reaction of at least two components selected from the group consisting of aliphatic glycols, aliphatic dicarboxylic acids, trifunctional polyols, tetrafunctional polyols, trifunctional oxycarboxylic acids, tetrafunctional oxycarboxylic acids, trifunctional polybasic carboxylic acids, tetrafunctional polybasic carboxylic acids, and acid anhydrides thereof, wherein the acid components consist essentially of aliphatic acids, wherein the reaction includes (a) succinic acid, or its anhydride, reacted with 1,4-butanediol, (b) succinic acid, or its acid anhydride, and adipic acid, or its anhydride, reacted with 1,4-butanediol, or (c) succinic acid, or its anhydride, reacted with ethylene glycol, wherein when a trifunctional component is present, the trifunctional component amount is 0.1–5 mole % relative to 100 mole % of all aliphatic dicarboxylic acids and acid anhydrides thereof, and when a tetrafuctional component is present, the tetrafunctional component amount is 0.1–3 mole % relative to 100 mole % of all aliphatic dicarboxylic acids and acid anhydrides thereof, and (B) has a number-average molecular weight of at least 10,000 and a melting point of at least 60° C.

2. An aliphatic polyester resin composition as claimed in claim 1, wherein said composition contains 10–70% by weight of inorganic fillers selected from the group consisting of metallic oxide, hydroxide, sulfate, carbonate and silicate, with the amount of combustion heat being 5,000 kcal/kg or less and Izod impact strength being at least 0.8 kg/cm$^2$.

3. An aliphatic polyester resin composition as claimed in claim 1 wherein the aliphatic polyester contains 0.03–3.0% by weight of urethane bonds.

4. An aliphatic polyester resin composition as claimed in claim 3 wherein the aliphatic polyester contains 0.05–2.0% by weight of urethane bonds.

5. An aliphatic polyester resin composition as claimed in claim 4 wherein the aliphatic polyester contains 0.1–1.0% by weight of urethane bonds.

6. An aliphatic polyester resin composition as claimed in claim 3 wherein the aliphatic polyester has a repeated chain structure in which a polyester prepolymer having a number-average molecular weight (Mn) of 10,000 or more and consisting of an aliphatic glycol and aliphatic dicarboxylic acid, is combined through the urethane bonds.

7. An aliphatic polyester resin composition as claimed in claim 3 wherein the aliphatic polyester has a repeated chain structure in which a polyester prepolymer having a number-average molecular weight (Mn) of 10,000 or more and obtained by reacting an aliphatic glycol, aliphatic dicarboxylic acid and, as the third component, at least one polyfunctional component selected from the group consisting of trifunctional or tetrafunctional polyols, oxycarboxylic acids and polybasic carboxylic acids or acid anhydrides thereof, is combined through the urethane bonds.

8. An aliphatic polyester resin composition as claimed in claim 7 wherein the polyester prepolymer contains one or more compounds selected from the group consisting of trimethylol propane, glycerin and pentaerythritol as the trifunctional or tetrafunctional polyol of the third component.

9. An aliphatic polyester resin composition as claimed in claim 7 wherein the polyester prepolymer contains one or more compounds selected from the group consisting of malic acid, citric acid and tartaric acid as the trifunctional or tetrafunctional oxycarboxylic acid of the third component.

10. An aliphatic polyester resin composition as claimed in claim 7 wherein the polyester prepolymer contains one or more compounds selected from the group consisting of trimesic acid, propane tricarboxylic acid, trimellitic anhydride, pyromellitic anhydride, benzophenone tetracarboxylic anhydride and cyclopentane tetracarboxylic anhydride as the trifunctional or tetrafunctional polybasic carboxylic acid of the third component.

* * * * *